(12) United States Patent
Wandernoth et al.

(10) Patent No.: US 6,259,086 B1
(45) Date of Patent: Jul. 10, 2001

(54) METHOD AND DEVICE FOR RECEIVING A PHASE-MODULATED LIGHT SIGNAL AND FOR THE DETECTION OF ALIGNMENT ERRORS

(75) Inventors: Bernhard Wandernoth, Kirchberg; Walter Guggenbuehl, Staefa; Urs Deflorin, Richterswil, all of (CH)

(73) Assignee: Contraves Space AG, Zurich (CH)

( * ) Notice: Subject to any disclaimer, the term of this patent is extended or adjusted under 35 U.S.C. 154(b) by 0 days.

(21) Appl. No.: 09/148,380

(22) Filed: Sep. 4, 1998

(30) Foreign Application Priority Data

Feb. 27, 1998 (CH) .................................................. 0472/98

(51) Int. Cl.[7] .................................................. H04L 27/00
(52) U.S. Cl. .................................... 250/208.2; 250/214 A
(58) Field of Search ........................... 250/208.2, 214 R, 250/214 A, 214 DC

(56) References Cited

U.S. PATENT DOCUMENTS 4,612,509 * 9/1986 Betts et al. ............................ 329/302

FOREIGN PATENT DOCUMENTS 280 075    8/1988  (EP) .
319 788    6/1989  (EP) .

* cited by examiner

*Primary Examiner*—John R. Lee
(74) *Attorney, Agent, or Firm*—Townsend and Townsend and Crew LLP; Guy W. Chambers

(57) ABSTRACT

The directional reception of extremely weak light signals without diverting a portion of the signal light into separate detectors for the purpose of obtaining an alignment signal is caused by the arrangement of several detector means (X, Y) which, when unmodulated light is superimposed on them, generate electrical output variables ($x_1$, $x_2$, $y_1$, $y_2$) which, after they have been added in a network (I), result in an information signal which, when it is linked by multiplication with several difference signals (x, y) formed in the network (I), converts them into narrow-band signals, which reproduce an alignment error.

20 Claims, 3 Drawing Sheets

METHOD AND DEVICE FOR RECEIVING A PHASE-MODULATED LIGHT SIGNAL AND FOR THE DETECTION OF ALIGNMENT ERRORS

FIELD OF THE INVENTION

The invention relates to a method for the detection of a light signal by means of a plurality of detection means which are spatially delimited from each other, by means of bringing together a sum signal, wherein narrow-band alignment signals are formed by means of multiplication or phase-sensitive rectification of differential signals formed from a plurality of detectors with the sum signal. The invention further relates to devices usable for executing the method.

BACKGROUND OF THE INVENTION

In the near future, optical free space communication between satellites as well as between a satellite and a ground station will become an important and, on board of the satellites a weight-saving, complement to the existing microwave technology. So-called optical terminals consist of one or several telescopes, which reduce the angular range of the field of vision of an optical receiver in the direction toward the counter-station and also see to a directional dissemination of the signals to be transmitted. Furthermore, several movable mirrors are provided, by means of which the alignment of the transmitting and receiving directions is performed. Besides the direct detection of the optical output of the transmitter of the counter-station as the transmission method, the coherent superimposition of the received light with the light of the same frequency of a local oscillator laser plays an important role, since in the process the indifference to interferences by radiation in the background is advantageous, besides a great sensitivity to the signal to be detected.

The output of the light signal to be detected is in general very low with the above mentioned systems, accordingly it is intended to use the largest possible portion of the light signal in a receiver for detecting the transmitted data. For example, because of the narrowband character of an error signal from the alignment device of the optical portion of the receiver, it would be conceivable to conduct a very small portion of the light entering the receiver to a field of detector means, which are delimited in respect to each other and are arranged in a plane, in order to obtain a directional error signal by means of the detection of the respectively illuminated detector means. However, such a method is only used for the rough alignment during the establishment of the connection. Since the light sources used for data transmission operate at a considerably lower optical output than special optical beacon transmitters used for establishing the connection, a coherent detection method is needed, which requires additional light output from a laser oscillator provided for the superimposition of the received light signal, as well as additional electronic means.

OBJECT AND SUMMARY OF THE INVENTION

It is accordingly the object of the invention hereinafter described to overcome the disadvantages of the prior art and to assure by means of a combined system the detection and demodulation of the information signal, along with the simultaneous derivation of a directional error signal, while making the best possible use of the output of the available light signal.

The present invention consists of detector means and several electronic modules arranged downstream thereof. Although only a single detection means is required for detecting of a, for example, phase-modulated light signal, into which both the light signal as well as an unmodulated light wave, which has the same mid-frequency or is relatively close to the mid-frequency of the light wave, are conducted, several detector means, which are delimited in respect to each other and are laterally offset, are used by the system in accordance with the invention. All detector means are illuminated in the same way by the locally generated, unmodulated light wave. The illumination by means of the light signal only takes place evenly as a function of the error in alignment of the optical receiving device in case of the disappearance, but in general is irregular. A mixing process takes place in each detector means by the squared conversion of the total amplitude of the light field into electrical current, from which a photo-flow with a mid-frequency arises, whose value corresponds to the difference between the optical mid-frequencies of the light signal and of the unmodulated light. A d.c. current is generated from this, which is proportionally added from the mean optical output of the light signals and of the unmodulated light. Since the optical output of the light signals falls below that of the unmodulated light by orders of magnitude, it is generally very difficult to generate a signal containing the alignment error from the d.c. current of the detector means. The signal current generated by multiplicative mixing is a proportional function of the output of the light signal impinging on the respective detection means, wherein the proportionality factor is correspondingly high because of the relatively high output of the unmodulated light.

The method in accordance with the invention contains the derivation of a signal corresponding to the alignment error from the signal flows of all detection means. By multiplying all signal flows with themselves, i.e. their squaring, it would be possible to generate a corresponding d.c. current from the individual signal flows. However, in this case there is no proportionality between the d.c. current and the optical output of the light signal in the individual detector means, and the sign of the error voltage would be lost. Furthermore, the error voltages would be a function of the strength of the incident light, i.e. of the transmission distance. It is now possible to remedy these two deficiencies by means of the invention, as will be described hereinafter.

The sum of all detector signals is formed, and their amplification is regulated by means of an amplifier, which can be adjusted in respect to an amplification factor in such a way that a signal level is created at the output, which is independent of the strength of all of the incident light.

This amplification regulation (AGC—automatic gain control) takes place, for example, on the basis of the comparison of the sum output signal with a reference variable. By the application of the same amplification factor, which is a function of the size of the sum signal, to the two difference signals x and y, the characteristic of the error signals (as a function of the amount of deviation of the light beam from the specified position) becomes independent of distance. It is therefore essential that the amplification regulation characteristics of the difference channels and the sum channel are matched to each other, which requires appropriate measures in accordance with switching technology. The actual formation of the narrow-band error signals now takes place by multiplying the AGC—regulated difference signals with the sum signal of a constant size. However, the so-called phase-sensitive rectification of the difference signals with the aid of the sum signal as the reference clock (so-called balanced modulation) offers itself as a more robust variant. Both alternatives basically realize the same function of the sign-correct demodulation of the error signal.

A large advantage results in that, besides the proportionality of the alignment error-dependent variable of the individual detector means obtained by this, its detection also is assured even with only very weak illumination of an individual detector means by the light signal. A further advantage resides in that because of the derivation of narrow-band error signals from the actual information signal, the highly sensitive coherent detection technique used in connection with the latter is also employed here, wherein furthermore no portion of the light signal is removed from conveying useful data. The multiple use of the electronic devices used for signal processing should be stressed, wherein the total dependability of the system is increased, in particular when used in satellite systems.

Further details, characteristics and advantages of the invention ensue not only from the claims and the characteristics which can be derived from them singly and/or in combination, but also from the following description of a preferred exemplary embodiment.

DETAILED DESCRIPTION OF THE PREFERRED EMBODIMENT

Figure 1:
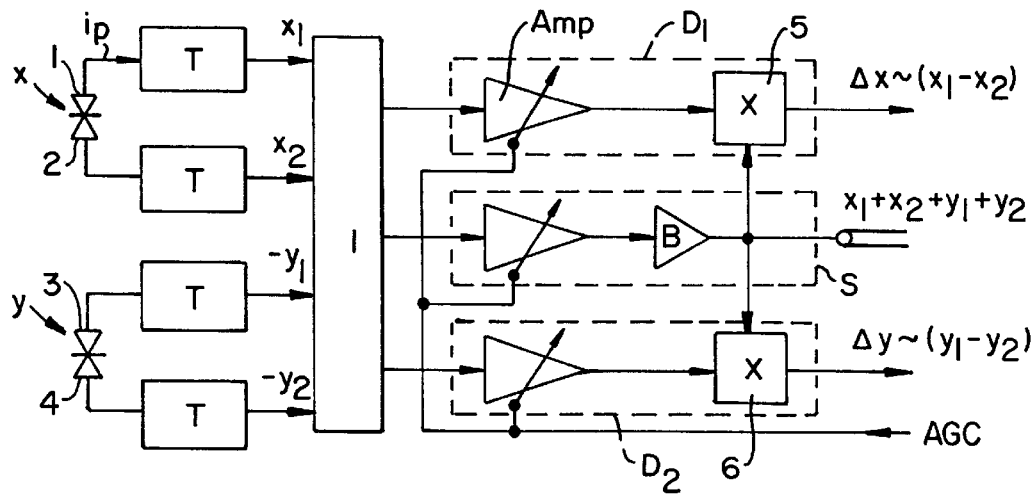
FIG. 1 is a block diagram of a device usable for executing the method.
Figure 2:
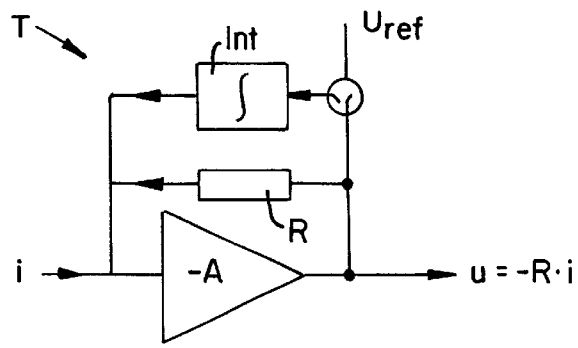
FIG. 2 is a block circuit diagram of a transimpedance amplifier.

As detector means, the device in accordance with FIG. 1 includes four photodiodes 1, 2, 3, 4 combined in pairs in the form of arrangements X and Y. These are respectively located in pairs on an appropriate semiconductor substrate which, for example, is provided with a circular detector surface, which is divided into two semicircularly shaped zones. Both arrangements X and Y have borders which are respectively orthogonal in respect to each other between the two zones of the photodiodes, and in the aligned state they are respectively illuminated both by a portion of the signal light as well as by unmodulated laser light. The splitting of the signal light beam is performed by means of a beam splitter and deflection mirrors. All photo currents ip generated in the arrangements X and Y enter a transimpedance amplifier T, by means of which they are converted into output voltages $x_1$, $x_2$, $y_1$ and $y_2$. With a coherent reception of the signal light, a relatively strong d.c. current is generated because of the superimposed unmodulated laser light, which is independent of the optical output of the signal light radiated on the arrangements X and Y. In the described device the separation of d.c. current components by means of the use of capacitors is omitted for technological reasons and in place of this a special embodiment of the transimpedance amplifier is used, which is represented in FIG. 2.

The transimpedance amplifier (TIA) known from the prior art consists of an inverting amplifier A with high no-load amplification and a negative feedback resistor R connected between the output and the input, which determines the conversion of the input current i into an outlet voltage u in accordance with u=i R. In accordance with the invention, this known TIA is expanded by an integrator Int into the negative feedback resistor R.

The integrator Int receives its input signal in the form of the difference of the mean output signal of the TIA in respect to a reference voltage $U_{ref}$. The output current of the integrator provides the compensation of the low-frequency current components at the TIA input, and relieves the TIA in particular of the relatively strong d.c. current of the photodiode employed as the mixing element. Simultaneously such TIAS, which are referenced to the same reference voltage, force the same output d.c. voltage in all TIAs, which is imperative for the subsequent further processing of the high-frequency signal portions without coupling capacitors.

The negative signs of the voltages—$y_1$, $y_2$ at the output of the y-TIA in FIG. 1 take into consideration the fact that, based on the peculiarities of the optical system, the output signals of the diode pair arranged in the y direction are phase-shifted by 180 in respect to those in the x direction. The high-frequency output voltages $x_1$, $x_2$, $y_1$, $y_2$ are passed on via a distributor network I in different combinations to three blocks. FIG. 1 formally shows the operations performed by these blocks. The signal differences $x_1-x_2$, or respectively $y_1-y_2$, are respectively pro performed in a difference channel block D1, or respectively D2, in which the operations of amplification regulation and phase-sensitive rectification; or respectively multiplication with the phase-correct sum signal $x_1+x_2+y_1+y_2$ are also performed. The so-called sum channel block S consists of a regulated amplifier, followed by a line adaptation stage B. The sum signal is now provided on the one hand as information carrier to a signal modulator and amplification regulation voltage generator (not represented in FIG. 1) via the lines connected downstream of the output, on the other hand directly to the error voltage-generating multiplicators of the difference channels.

Figure 6:
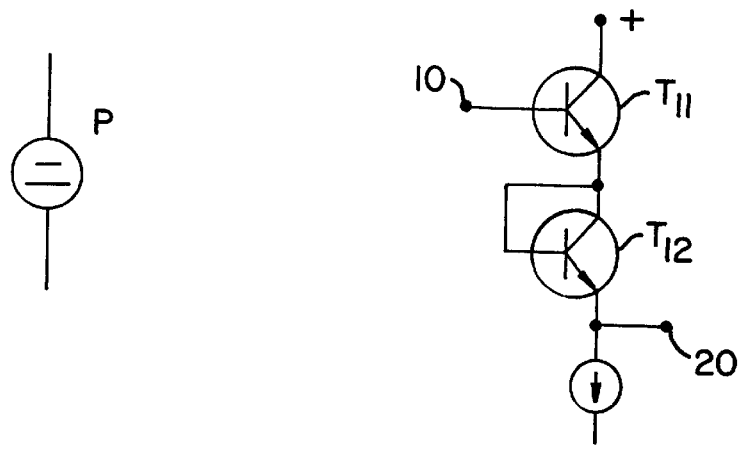
FIG. 6 shows a level displacement device.
Figure 7:
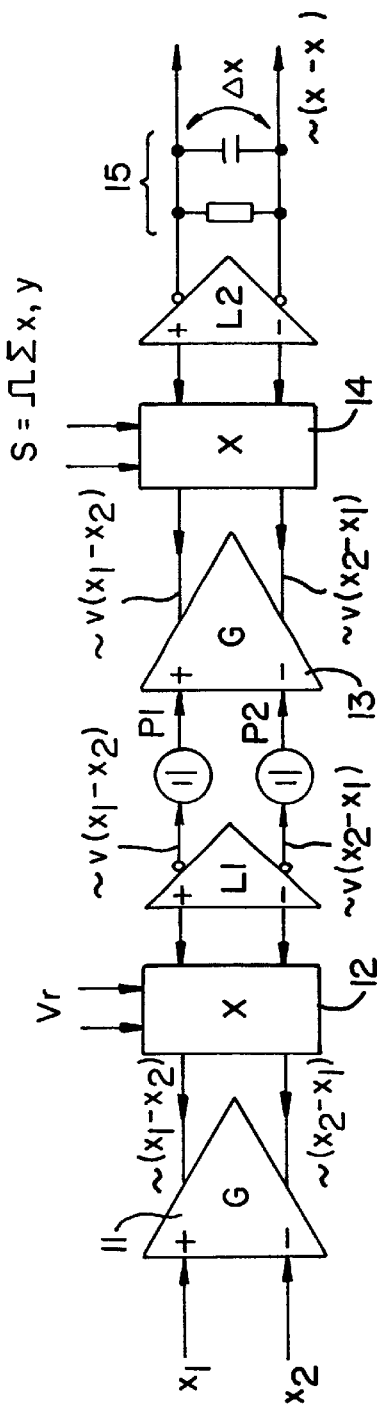
FIG. 7 is a block diagram of a difference channel.

Each one of the two difference channel blocks D1, or respectively D2 has a structure shown in more detail in FIG. 7. It comprises a difference stage 11 in accordance with FIG. 3, followed by a Gilbert cell 12 as the multiplicator X in accordance with FIG. 4, a transimpedance load $L_1$ in accordance with FIG. 5, level displacement devices $P_1$, $P_2$ in accordance with FIG. 6, a further difference stage in accordance with FIG. 3, a further Gilbert cell 14 as multiplicator X in accordance with FIG. 4 as well as a further differential transimpedance load $L_2$ in accordance with FIG. 5, which is followed by a low bandpass filter 15 for separating a.c. current portions. While the Gilbert cell 12, the first viewed from the left, is used for regulating the amplification factor, wherein the difference voltage $V_v$ can be identified as the regulation voltage AGC in FIG. 1, the Gilbert cell 14, which is the second viewed from the left, is used for the multiplication of the difference voltage $\Delta x$, or respectively $\Delta y$, with the phase-correct sum signal $x_1+x_2+y_1+y_2$, or respectively the phase-sensitive rectification.

Figure 3:
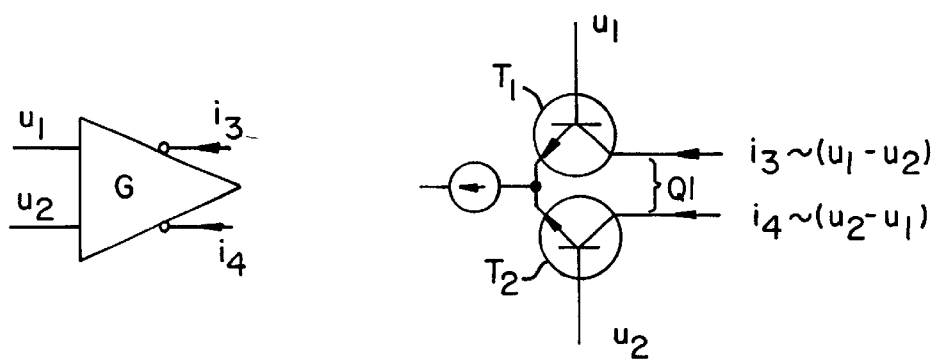
FIG. 3 shows a difference stage.

The difference stage, represented in FIG. 3 in the form of a greatly simplified diagram, is a device which essentially includes a current source $Q_1$ and a transistor $T_1$ and a transistor $T_2$. The two transistors $T_1$ and $T_2$ respectively generate an output current $i_3$, or respectively $i_4$, each of which is respectively proportional to the difference of the voltages $U_1$, or respectively $U_2$ appearing as input variables, since both transistors $T_1$ and $T_2$ competitively pick up the current generated by a current source $Q_1$. In most cases a series resistor for increasing the input impedance is switched into both emitter lines.

Figure 4:
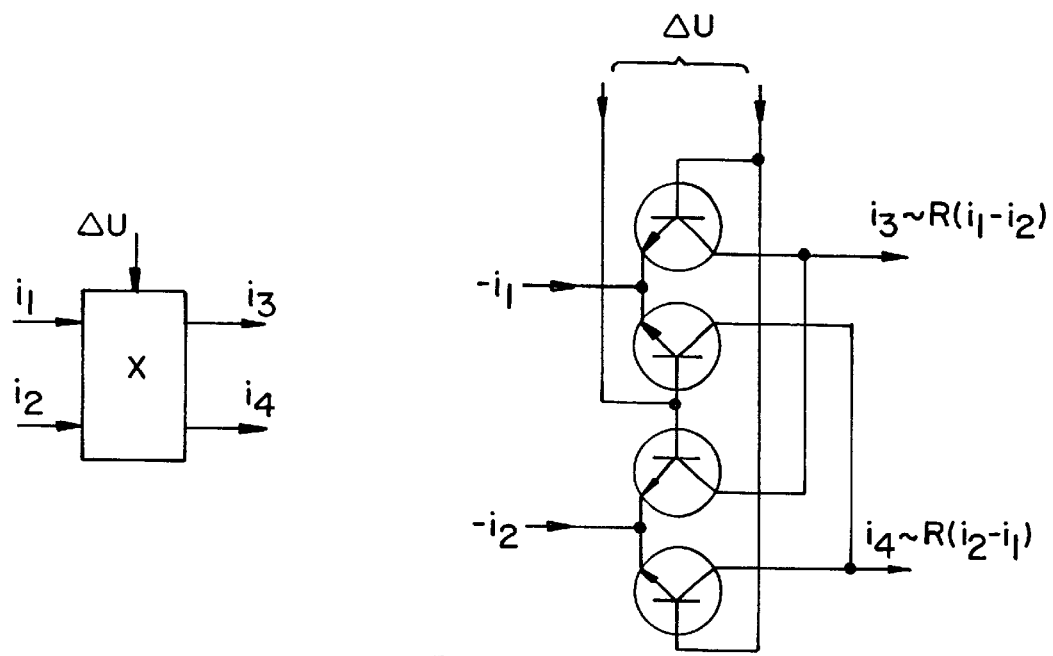
FIG. 4 shows a Gilbert cell.

The device, which is represented in greatly simplified form in FIG. 4, is composed of two devices in accordance with FIG. 3, two input currents $i_1$ and $i_2$ are used as the replacement for the current source $Q_1$, and a difference voltage ΔU existing between the transistors $T_1$ and $T_2$ replaces the difference between the voltages $U_1$ and $U_2$, which is effective in the device in accordance with FIG. 3. Resultant output currents $i_3$ and $i_4$ are proportional to the product of the difference voltage ΔU and the difference between the input currents $i_1$ and $i_2$, and they differ by their sign. This arrangement is called a Gilbert cell in the technical literature.

Figure 5:
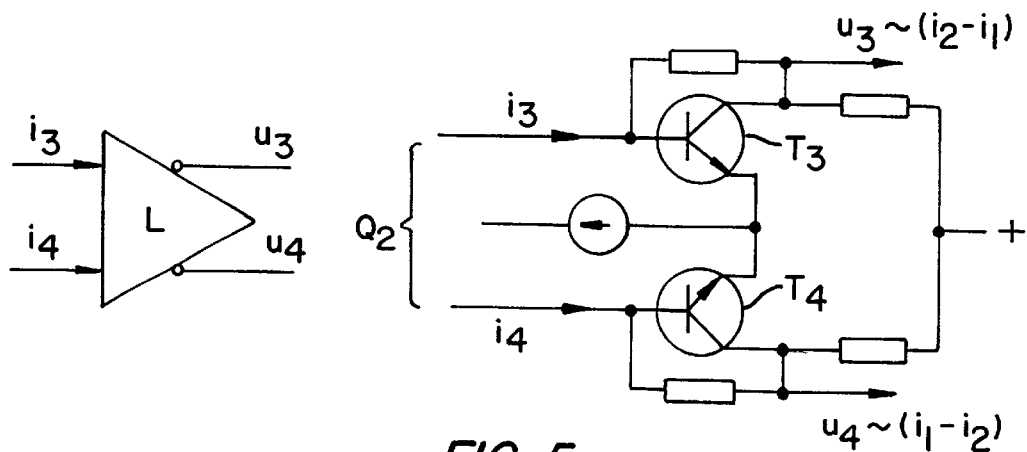
FIG. 5 shows a structure of a differential impedance load.

The device represented in a greatly simplified form in FIG. 5 contains a current source $Q_2$, whose current is competitively picked up by two transistors $T_3$ and $T_4$. The transistors $T_3$ and $T_4$ amplify currents $i_3$ and $i_4$ appearing as input variables, because of which the current generated by the current source $Q_2$ is split into two portions, whose amplitude with respectively opposite signs is proportional to the difference between that of the currents $i_3$ and $i_4$. Voltages $U_3$ and $U_4$, which are proportional to these currents, are taken from this device as output variables.

A level displacement device P represented in FIG. 6 is primarily used for matching the d.c. current levels of successive amplifier stages and for the reduction of the output impedances of the circuits upstream of the point 10. The current amplified in the transistor $T_{11}$ flows, into the circuit output point 2. With a sufficiently high-resistance load at the point 20, it follows in accordance with the signal voltage the point 10 (emitter sequence concept) with an approximately constant d.c. current offset. The transistor $T_{12}$, provided in series with the emitter of $T_{11}$ and switched as a diode, increases this voltage offset in respect to the simple emitter sequence.

Figure 8:
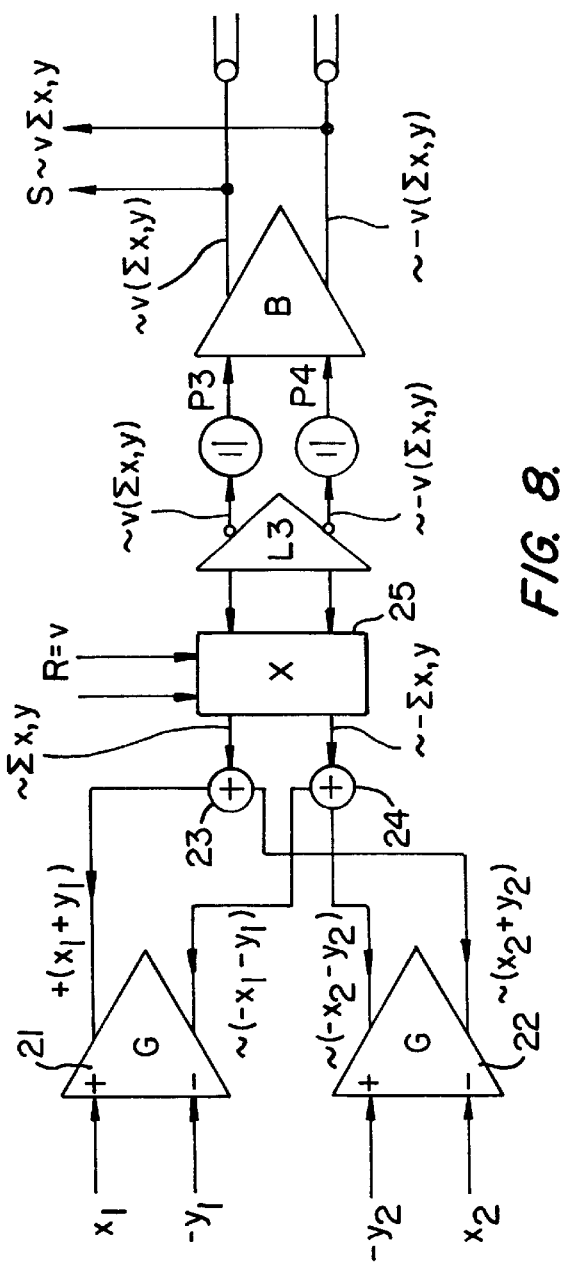
FIG. 8 is a block diagram of a sum channel.

A further design of a sum channel S in accordance with FIG. 1 in combination with corresponding elements of the network I in accordance with FIG. 1 is represented in FIG. 8.

The signals $x_1$ and $x_2$, or respectively $y_1$ and $y_2$, are of opposite phase in respect to each other because of peculiarities of the upstream placed optical components. The summation of the signals is then formed with the use of difference amplifiers as follows: by means of supplying a suitable combination of TIA output pairs to the inputs of two difference stages of the type represented in FIG. 3, and suitable output lines, the inputs of the downstream connected Gilbert cell can be charged with two oppositely phased sum signals, which are then, multiplied with the AGC signal at the output of the Gilbert cell, available as differential currents and which are converted in the differential load circuit into corresponding voltages.

A so-called buffer amplifier B with a voltage amplifier approximately =1 for impedance matching to two 50 lines follows this amplifier block in the sum channel after a level displacement circuit.

The devices 5 and 6 in FIG. 1 may be multiplication means or, e.g., a phase. sensitive demodulation means. Since the second difference channel block is similar to the first one, its configuration is illustrated by existing FIG. 7. The sum channel block S according tc FIG. 8 comprises a controlled amplifier AMP having a pair of difference stages 21, 22 connected via two adders 23, 24 to a further Gilbert cell 25 having two outputs which are connected to the inputs of a line adaptation stage B via a differential transimpedence load Lax and a pair of following level displacement devices $P_3$, $P_4$. The outputs of said line adaptation stage supply a positive and a negative sum signal for said multiplication means. A preferred application of the method and device according to the present invention is for receiving a phase modulated light signal and for the detection of alignment errors of said light signal.

What is claimed is:

1. A method for detection of a light signal and obtaining error signals for correction of alignment errors of said light signal, comprising the following steps:
   detecting said light signal by means of a plurality of photosensitive detection means with outputs giving photo currents which are fed into a transimpedence amplifier in which said photo currents are converted into output voltages $x_1$, $x_2$, $y_1$, $y_2$;
   distributing said output voltages via a distributor network to a first difference channel block in which a first difference signal $x_1-x_2$, is generated, to a second difference channel block in which a second difference signal $y_1-y_2$ is generated and to sum channel block in which a sum signal $x_1+x_2+y_1+y_2$ is generated;
   performing in said difference channel blocks either a multiplication of said first and second difference signals with said sum signal or a phase-sensitive demodulation of said first and second difference signals with said sum signal as reference; and
   wherein said difference channel blocks each have an output providing an error signal approximately equal to said difference signals, and wherein said error signals are, narrow-band error signals for correction of alignment errors of said light signal.

2. The method in accordance with claim 1, wherein prior to difference channel block multiplication or demodulation steps, the sum and difference signals pass through individual amplifiers which can be electronically controlled with respect to their gain and which have the same control characteristics, and wherein these gains are set via a common automatic gain control signal.

3. A device for the detection of a light signal, comprising at least two pairs of photosensitive detection means which are each connected to a transimpedence amplifier wherein each transimpedence amplifier has an output connected to a respective input of a distributor network and further comprising a first difference channel block, a second difference channel block and a sum channel block which each have inputs connected to outputs of said distributor network, wherein each said detection means gives a photo current to said respective transimpedence amplifier which converts said photo currents into output voltages $x_1$, $x_2$, $y_1$, $y_2$ which are distributed via said distributor network to said difference channel blocks and said sum channel block, respectively, wherein said first difference channel block includes first subtraction means to generate a first difference signal $x_1-x_2$, said second difference channel block includes second subtraction means to generate a second difference signal $y_1-y_2$ and said sum channel block includes summation means to generate a sum signal $x_1+x_2+y_1+y_2$, wherein said first and second difference channel blocks are each provided with a demodulation means for demodulating said first and second difference signals with said sum signal as a reference, and wherein said difference channel blocks have output signals which are narrowband error signals.

4. The device according to claim 3, wherein said demodulation means are a phase sensitive demodulation means.

5. The device in accordance with claim 4, wherein said first and second subtraction means and said summation means each include an amplifier which can be electronically controlled with respect to its gain and which each have the same control characteristics, and wherein these gains are set via a common automatic gain control signal.

6. A device for the detection of a light signal, comprising at least two pairs of photo-sensitive detection means which are each connected to a transimpedence amplifier wherein each transimpedence amplifier has an output connected to a respective input of a distributor network and further comprising a first difference channel block, a second difference channel block and a sum channel block which have each inputs connected to respective outputs of said distributor network, wherein each said detection means gives a photo current to said respective transimpedence amplifier which converts said photo currents into output voltages $x_1$, $x_2$, $y_1$, $y_2$, which are distributed via said distributor network to said difference channel blocks and said sum channel block, respectively, wherein said first difference channel block includes first subtraction means to generate a first difference signal $x_1-x_2$, said second difference channel block includes second subtraction means to generate a second difference signal $y_1-y_2$ and said sum channel block includes summation means to generate a sum signal $x_1+x_2+y_1+y_2$, wherein said first and second difference channel blocks are each provided with a multiplication means in which a multiplication of said first and second difference signals with said sum signal is performed, and wherein said difference channel blocks have output signals which are narrow-band error signals.

7. The device in accordance with claim 6, wherein said first and second subtraction means and said summation means each include an amplifier connected to said distributor network.

8. The device in accordance with claim 7, wherein said transimpedence amplifier includes an inverting amplifier having a negative feedback resistor and an integrator connected between the output and the input of said inverting amplifier.

9. The device in accordance with claim 7, wherein each of said subtraction means and summation means amplifiers is followed by a Gilbert cell.

10. The device in accordance with claim 7, wherein said multiplication means is followed by a Gilbert cell.

11. The device in accordance with claim 7, wherein said subtraction means amplifiers are followed by a first Gilbert cell having two outputs, wherein said multiplication means includes an amplifier having two inputs followed by a second Gilbert cell, wherein one output of said first Gilbert cell is connected to one input of said multiplication means amplifier via a first input of a differential transimpedence load and a first level displacement device, wherein a second output of said first Gilbert cell is connected to a second input of said multiplication means amplifier via a second input of said differential transimpedence load and a second level displacement device.

12. The device in accordance with claim 11, wherein the outputs of said second Gilbert cell are connected to the inputs of a second differential transimpedence load followed by a low band-pass filter.

13. The device in accordance with claim 12, wherein said subtraction and multiplication means amplifiers can be electronically controlled with respect to their gain, have the same characteristics, and wherein their gains are set via a common automatic gain control signal.

14. The device in accordance with claim 13, wherein said multiplication means are arranged for generating a signal current by multiplicative mixing which is approximately a proportional function of the output of the light signal impinging on the respective detection means.

15. The device in accordance with claim 7, further comprising photosensitive detection arrangements which are spatially delimited from each other and arranged to be evenly illuminated with unmodulated narrow-band light.

16. The device in accordance with claim 7, further comprising photosensitive detection arrangements of paired groups which are spatially delimited from each other and arranged to be illuminated by partial beams of said light signal, and wherein said pair has a first and a second photosensitive detection means.

17. The device in accordance with claim 16, wherein said first photosensitive detection means is arranged to obtain photo currents which are opposite in phase to those in the second photosensitive detection means, and wherein said photosensitive detection means are arranged to be evenly illuminated by means of unmodulated light by superimposition with the partial beams of said light signal.

18. The device in accordance with claim 7, wherein said difference channel blocks and said sum channel block are designed as circuits which are placed on a single chip.

19. The device in accordance with claim 6, wherein said first and second subtraction means and said summation means each include an amplifier which can be electronically controlled with respect to its gain and which each have the same control characteristics and wherein these gains are set via a common automatic gain control signal.

20. The device in accordance with claim 19, wherein said summation means amplifier is a pair of difference stages connected via two adders to a Gilbert cell having two outputs, further comprising a line adaptation stage having two inputs, wherein the outputs of said Gilbert cell are connected to the inputs of said line adaption stage via a further differential transimpedence load and a pair of following further level displacement devices, and wherein the outputs of said line adaption stage supply a positive and/or a negative sum signal for said multiplication means.

\* \* \* \* \*